(12) United States Patent
Arnett et al.

(10) Patent No.: US 10,399,047 B2
(45) Date of Patent: Sep. 3, 2019

(54) BLENDING SYSTEM

(71) Applicant: VITA-MIX MANAGEMENT CORPORATION, Olmsted Township, OH (US)

(72) Inventors: Michael Arnett, Columbia Station, OH (US); James Philip Bascom, Brecksville, OH (US); Scott Christopher Bly, Olmsted Falls, OH (US); Richard D. Boozer, Wakeman, OH (US); Kolman Juhasz, Parma, OH (US); David Kolar, Stow, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 15/858,095

(22) Filed: Dec. 29, 2017

(65) Prior Publication Data

US 2018/0117548 A1    May 3, 2018

Related U.S. Application Data

(63) Continuation of application No. 14/214,063, filed on Mar. 14, 2014, now Pat. No. 9,855,535, which is a
(Continued)

(51) Int. Cl.
*A47J 43/00* (2006.01)
*B01F 7/16* (2006.01)
(Continued)

(52) U.S. Cl.
CPC .......... *B01F 7/162* (2013.01); *A47J 43/046* (2013.01); *A47J 43/0716* (2013.01); *A47J 43/0766* (2013.01)

(58) Field of Classification Search
CPC .. A47J 43/046; A47J 43/0716; A47J 43/0766; B01F 7/162
See application file for complete search history.

(56) References Cited

U.S. PATENT DOCUMENTS 2,282,866 A   5/1942   Hagen
4,335,860 A   6/1982   Grandel et al.
(Continued)

FOREIGN PATENT DOCUMENTS

CN   10904700   5/2012
EP    0024992   3/1981
(Continued)

OTHER PUBLICATIONS

Young, Lee W., International Search Report and Written Opinion, PCT/US/2014/29446, Aug. 5, 2014, International Search Authority/USA.
(Continued)

*Primary Examiner* — Anshu Bhatia
(74) *Attorney, Agent, or Firm* — McDonald Hopkins LLC

(57) ABSTRACT

A blending system is shown and described herein. A blending system may include a base including a motor and a first shell that encases the motor. The blending system may also include a container that is removably coupled to the blender base. The blending system may also have a second shell selectively attached to the first shell. The blending system may also have a wall positioned within the base to direct airflow from the fan along a volute-shaped path.

18 Claims, 19 Drawing Sheets

Related U.S. Application Data continuation-in-part of application No. 14/195,159, filed on Mar. 3, 2014.

(60) Provisional application No. 61/789,455, filed on Mar. 15, 2013, provisional application No. 61/771,367, filed on Mar. 1, 2013.

(51) Int. Cl.
*A47J 43/046* (2006.01)
*A47J 43/07* (2006.01)

(56) References Cited

U.S. PATENT DOCUMENTS

| | | | |
|---|---|---|---|
| 4,471,915 A | 9/1984 | Levin et al. | |
| 4,678,881 A | 7/1987 | Griffith | |
| 4,741,482 A | 5/1988 | Coggiola et al. | |
| 4,885,917 A | 12/1989 | Spector | |
| 4,913,555 A | 4/1990 | Maeda et al. | |
| 4,993,840 A | 2/1991 | Maeda et al. | |
| 5,273,358 A | 12/1993 | Byrne et al. | |
| 5,274,207 A | 12/1993 | Griffith | |
| 5,368,384 A | 11/1994 | Duncan et al. | |
| 5,478,149 A | 12/1995 | Quigg | |
| 5,567,049 A | 10/1996 | Beaudet et al. | |
| 5,655,834 A * | 8/1997 | Dickson | A21C 1/14 241/282.1 |
| 5,852,968 A | 12/1998 | Sundquist | |
| 5,855,431 A | 1/1999 | Costanzo | |
| 6,095,677 A | 8/2000 | Karkos, Jr. et al. | |
| 6,149,035 A | 11/2000 | Gorski et al. | |
| 6,210,033 B1 | 4/2001 | Karkos, Jr. et al. | |
| 6,318,247 B1 | 11/2001 | Di Nunzio et al. | |
| 6,325,312 B1 | 12/2001 | Karkos, Jr. | |
| 6,336,603 B1 | 1/2002 | Karkos, Jr. et al. | |
| 6,416,215 B1 | 7/2002 | Terentiev | |
| 6,460,368 B1 | 10/2002 | Grande Damaso | |
| 6,494,390 B1 | 12/2002 | Khait et al. | |
| 6,513,966 B1 | 2/2003 | Gort-Barten et al. | |
| 6,540,394 B2 | 4/2003 | Juriga | |
| 6,554,466 B1 | 4/2003 | Lee | |
| 6,568,843 B1 | 5/2003 | Lai | |
| 6,595,113 B1 * | 7/2003 | Chang | A47J 43/0716 366/205 |
| 6,629,492 B1 | 10/2003 | Li | |
| 6,637,681 B1 | 10/2003 | Pianca et al. | |
| 6,712,497 B2 | 3/2004 | Jersey et al. | |
| 6,758,593 B1 | 7/2004 | Terentiev | |
| 6,793,167 B2 | 9/2004 | Karkos, Jr. et al. | |
| 6,899,454 B2 | 5/2005 | Terentiev | |
| 6,910,800 B2 | 6/2005 | Wu | |
| 7,270,156 B2 | 9/2007 | Beesley et al. | |
| 7,314,307 B2 | 1/2008 | Cai | |
| 7,318,666 B1 | 1/2008 | Lin | |
| 7,407,320 B1 | 8/2008 | Lin | |
| 7,530,510 B2 | 5/2009 | Newman et al. | |
| 7,871,196 B2 | 1/2011 | Lin | |
| 7,905,728 B2 | 3/2011 | Piontek | |
| 8,087,818 B2 | 1/2012 | Drees | |
| 8,186,872 B2 | 5/2012 | Bartholomew et al. | |
| 8,220,730 B2 | 7/2012 | Ferraby et al. | |
| 8,230,774 B1 | 7/2012 | Hunte | |
| 8,240,909 B2 | 8/2012 | Athey et al. | |
| 8,282,268 B2 | 10/2012 | Karkos, Jr. et al. | |
| 8,360,480 B2 | 1/2013 | Athey et al. | |
| 8,376,253 B2 | 2/2013 | Obiak et al. | |
| 8,403,555 B2 | 3/2013 | Wu | |
| 8,403,556 B2 | 3/2013 | Wu | |
| 8,480,292 B2 | 7/2013 | Dunshine et al. | |
| 8,550,388 B2 | 10/2013 | Donaldson et al. | |
| 8,608,371 B2 | 12/2013 | Bartholomew et al. | |
| 8,621,982 B2 | 1/2014 | Nosler et al. | |
| 8,621,990 B2 | 1/2014 | Fang et al. | |
| 8,702,300 B2 | 4/2014 | Audette | |
| 8,814,072 B2 | 8/2014 | Gushwa | |
| 2002/0071340 A1 | 6/2002 | Juriga | |
| 2005/0068847 A1 | 3/2005 | Sands | |
| 2005/0174882 A1 | 8/2005 | Krasne et al. | |
| 2006/0176765 A1 * | 8/2006 | Pryor, Jr. | A47J 43/046 366/192 |
| 2006/0286255 A1 | 12/2006 | Xu et al. | |
| 2008/0037360 A1 | 2/2008 | McGill | |
| 2008/0089170 A1 | 4/2008 | Larsen et al. | |
| 2008/0089171 A1 | 4/2008 | Larsen | |
| 2008/0098905 A1 | 5/2008 | Steiner et al. | |
| 2008/0198688 A1 | 8/2008 | Peng | |
| 2008/0264927 A1 | 10/2008 | Peng | |
| 2009/0084274 A1 * | 4/2009 | Kovacic | A47J 43/0766 99/492 |
| 2009/0186139 A1 | 7/2009 | Dragan | |
| 2009/0260523 A1 | 10/2009 | Peng | |
| 2010/0018982 A1 | 1/2010 | Liu | |
| 2010/0044303 A1 | 2/2010 | Perrault et al. | |
| 2010/0046323 A1 | 2/2010 | Tien et al. | |
| 2011/0013478 A1 | 1/2011 | Athey | |
| 2011/0222367 A1 * | 9/2011 | Allen | A47J 43/0716 366/206 |
| 2011/0232506 A1 | 9/2011 | Cai | |
| 2011/0241503 A1 | 10/2011 | Simon | |
| 2011/0248108 A1 | 10/2011 | Carriere | |
| 2012/0206995 A1 | 8/2012 | Wu | |
| 2012/0275852 A1 | 11/2012 | Athey et al. | |
| 2012/0294109 A1 | 11/2012 | Boozer | |
| 2013/0028044 A1 | 1/2013 | Karkos, Jr. et al. | |
| 2013/0043337 A1 | 2/2013 | Rukavina et al. | |
| 2013/0319034 A1 | 12/2013 | Kounlavong et al. | |
| 2013/0344204 A1 | 12/2013 | Goodson | |
| 2014/0212566 A1 | 7/2014 | Herbert et al. | |

FOREIGN PATENT DOCUMENTS

| | | |
|---|---|---|
| EP | 0041082 | 12/1981 |
| EP | 1647217 | 4/2006 |
| EP | 1688046 | 8/2006 |
| WO | WO2011/113083 | 9/2011 |
| WO | 2014008926 | 1/2014 |
| WO | 2014009339 | 1/2014 |
| WO | 2014121838 | 8/2014 |
| WO | 2014122254 | 8/2014 |
| WO | 2014122257 | 8/2014 |
| WO | 2014122260 | 8/2014 |

OTHER PUBLICATIONS

International Search Report and the Written Opinion of the International Searching Authority, PCT/US2014/019866, Vita-Mix Corporation, Jun. 25, 2014.

Communication of the European Patent Office for Application No. 14756728.3 dated Nov. 22, 2018; 4 pages.

* cited by examiner

BLENDING SYSTEM

CROSS-REFERENCE TO RELATED APPLICATION

This application is a continuation of U.S. patent application Ser. No. 14/214,063, filed Mar. 14, 2014, which is a continuation-in-part of U.S. patent application Ser. No. 14/195,159, filed Mar. 3, 2014, which claims the benefit of U.S. Provisional Patent Application Ser. No. 61/771,367, filed Mar. 1, 2013, and entitled "Blender System," and U.S. Provisional Patent Application Ser. No. 61/789,455, filed Mar. 15, 2013, and entitled "Quad Seal for a Blender," all of which are incorporated herein by reference.

TECHNICAL FIELD

The present teachings relate to a blending system, and more particularly, to a high performance, small format blending system.

BACKGROUND

Blending systems are often used to blend and process foodstuffs. In recent years, personal blending systems have been developed with blending containers that are designed to serve a dual purpose and function as both a blending container and a drinking vessel. Typically, the container may include the foods for blending and then will connect at its top with a blade assembly. Once connected, the user may invert the container/blade assembly so that the container/blade assembly engages with the personal blending system base. Once blending is completed, the user may remove the container/blade assembly from the base, invert it again, and remove the blade assembly from the cup. The user can then directly drink from that container, or insert a top on the container for later use.

The personal blending system may have an interface between the container and the blade assembly, such as an o-ring. This interface may generally prevent liquid from leaking out of the container when attached to the blade assembly. That o-ring may typically include a solid round or square cross-sectional shape. This shape may generally create an air-tight seal between the two structures.

However, those conventional personal blending systems have relatively small motors and thus, do not observe the potential pressure build-up in the container as would a blender with a high performance motor, such as a 2 HP motor. As a result, the use of a conventional sealing system with a high performance blender can create a large and unsafe pressure condition within the container.

SUMMARY

A blending system is shown and described herein. A blending system may include a base having a motor and a first shell that encases the motor. The blending system may also include a container that is removably coupled to the blender base. The blending system may also have a second shell selectively attached to the first shell.

A blending system may include a base having a motor, an inner shell encasing the motor, and a top shell attached to the inner shell. The blending system may also have a blade base assembly removably attached to the base. The blade base may have a blade positioned in proximity to an interior surface and operatively coupled with the motor. The blending system may also have a container including an inner and outer layer. The container may selectively attach to the blade base.

A blending system may include a base encasing a motor and a fan. The blending system may also have a container configured to accept and hold material. The blending system may also have a wall positioned within the base to direct airflow from the fan along a volute-shaped path.

DESCRIPTION OF THE DRAWINGS

The present teachings may be better understood by reference to the following detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
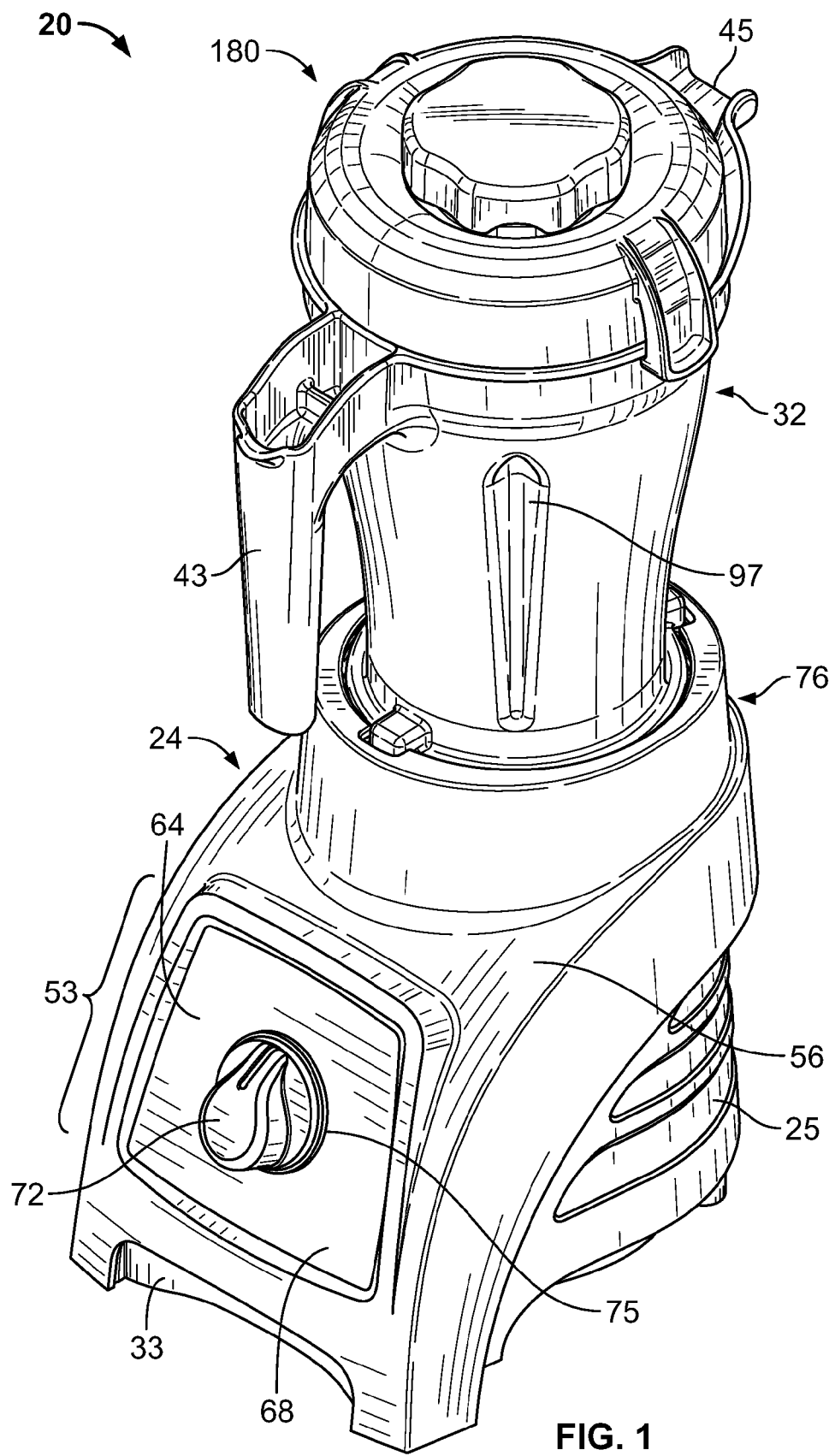
FIG. 1 is a perspective view of a blender system with a blending container.
Figure 2:
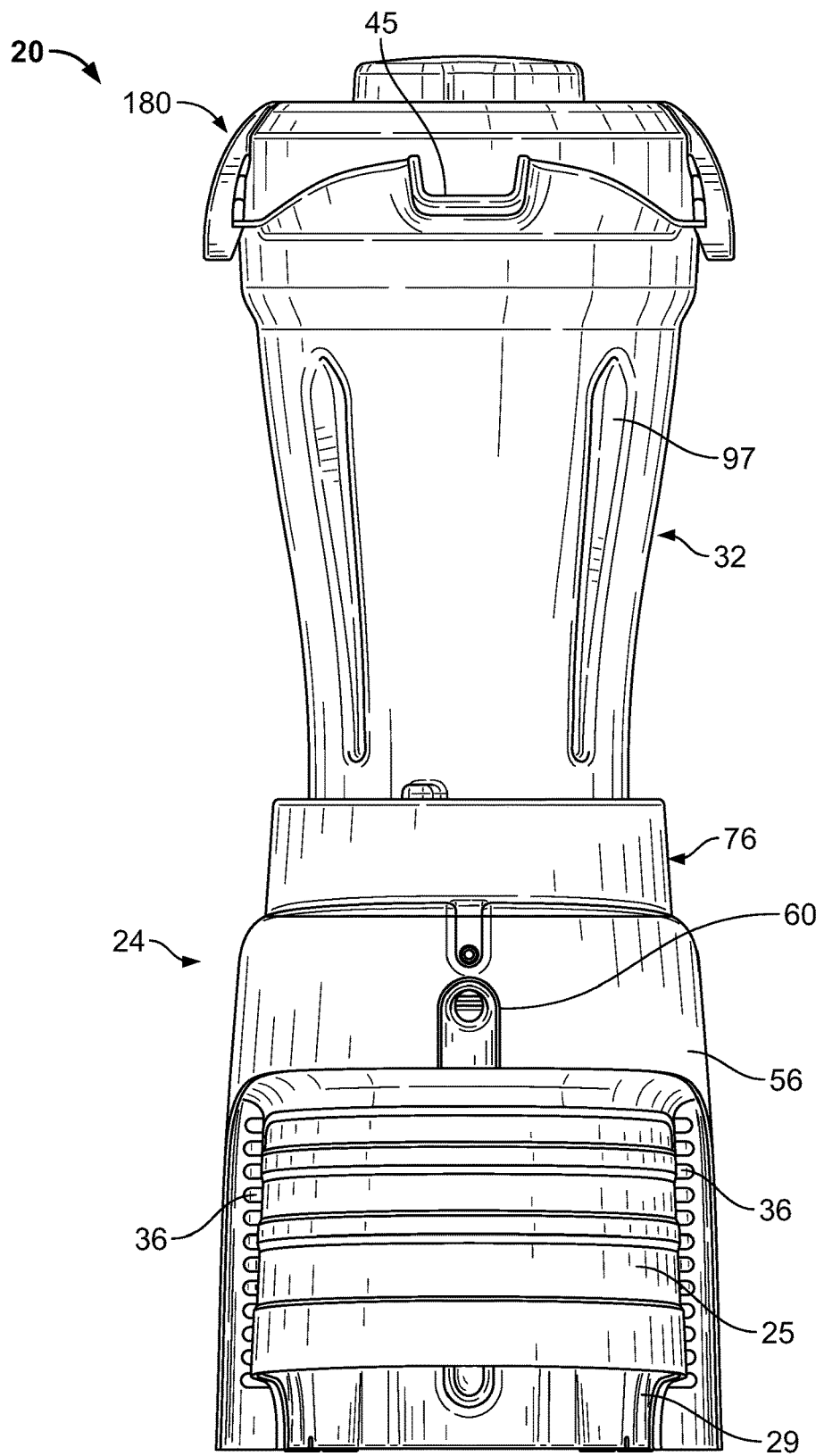
FIG. 2 is a back view of a blender system with a blending container.
Figure 3:
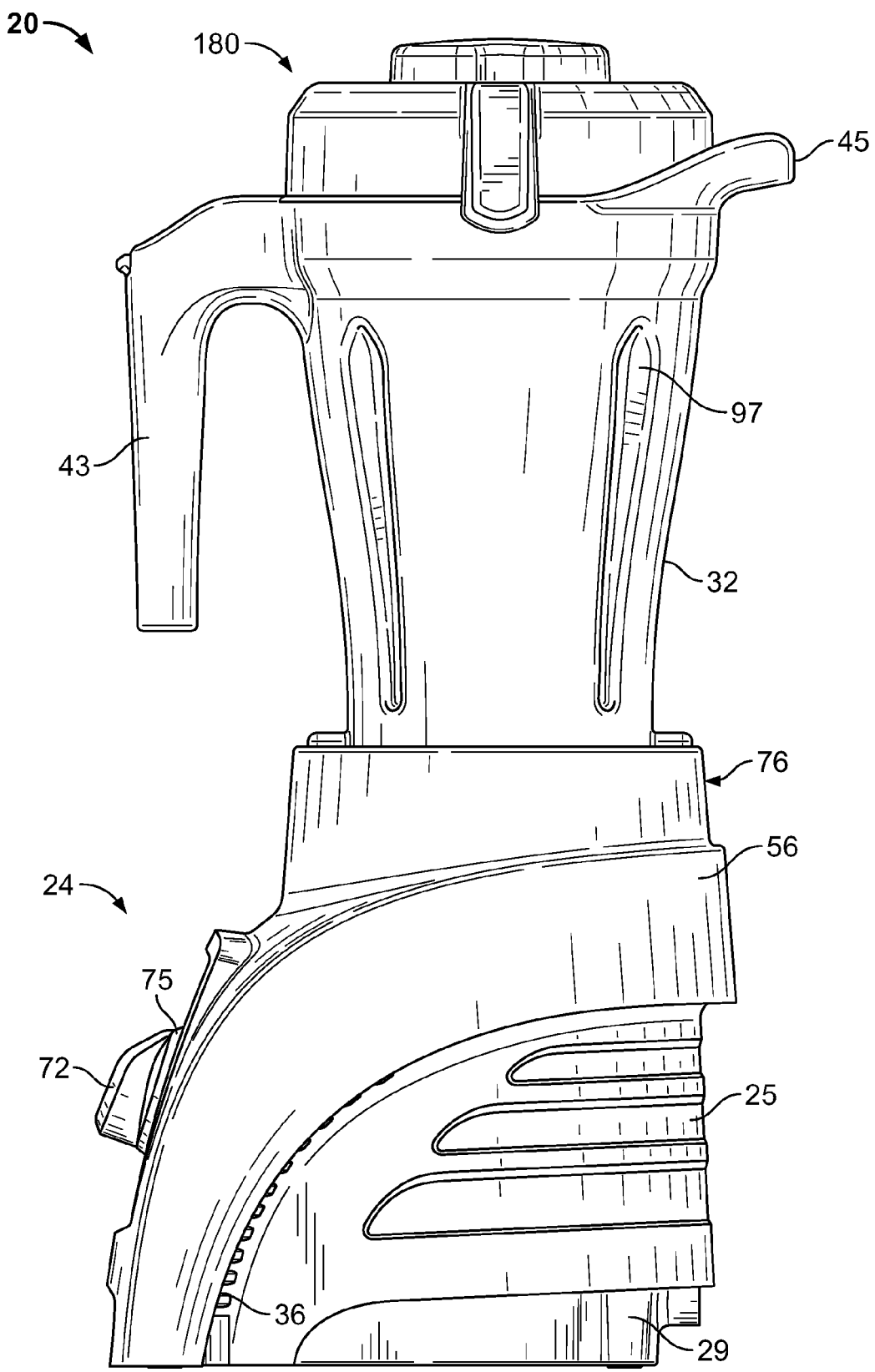
FIG. 3 is a side view of a blender system with a blending container.

A blending system 20 of the present teachings is shown in FIGS. 1-3. The blending system 20 may include a blender base 24, a blade base 28, and at least one blending container 32 of appropriate configurations. The blade base 28 may be selectively and operatively coupled with the blender base 24 and the blending container 32 as described in more detail below. The blending system 20 may include an interlock feature 34 that may generally prevent operation of the blending system when and if the blending container and blender base 24 become disengaged as described in more detail below. The blending system 20 may have a smaller configuration than traditional blending systems. The blending system 20 may have a smaller footprint and smaller profile than traditional blending systems. The blending system 20 may be considered a personal or individual blending system. However, it should be understood that the present teachings are not limited to personal blending system. The present teachings may apply to any appropriate blending system.

Figure 4:
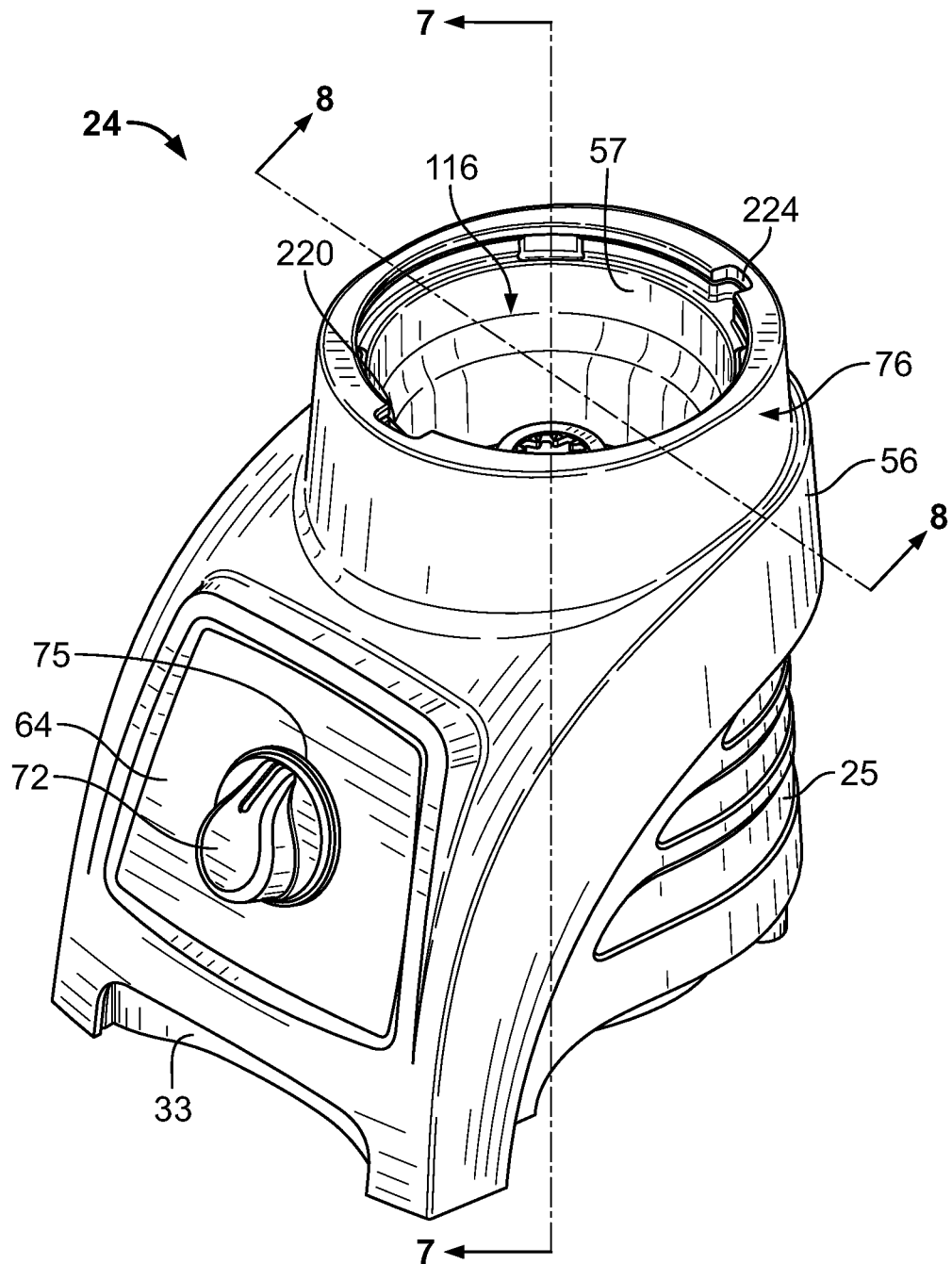
FIG. 4 is a perspective view of a blender base.
Figure 5:
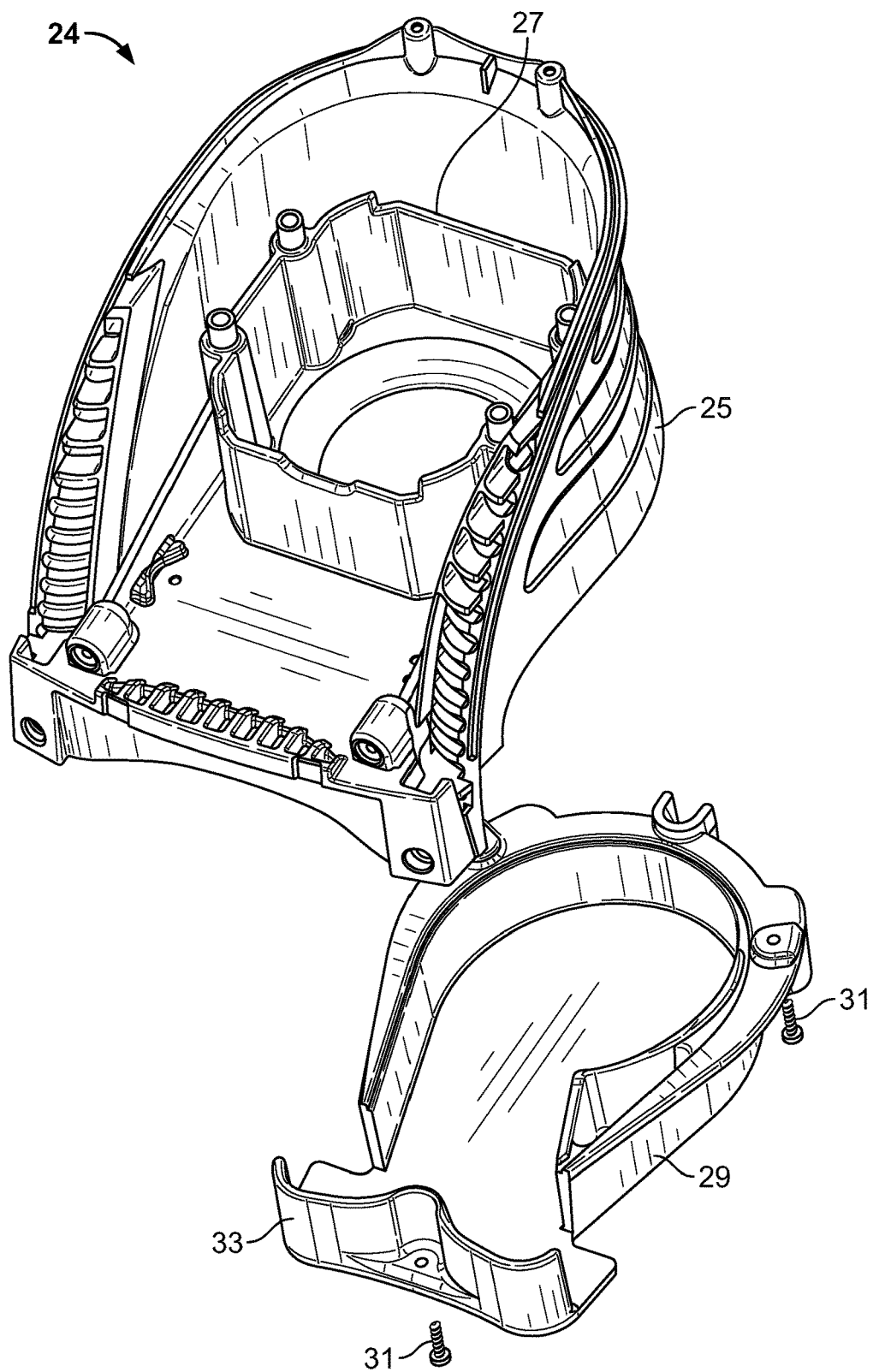
FIG. 5 is an exploded view of a blender base.

As shown in FIG. 4, the blender base 24 may be any appropriate size and configuration. The blender base 24 may be of a configuration to house and generally protect the operative components of the blending system 20. The blender base 24 may be unibody. Alternatively, as shown in FIG. 5, the base 24 may be formed of multiple pieces including a main body 25 which encases several components, including a motor housing 27, as well as a high performance motor, sound damping components, and fan (all not shown). A foot member 29 may be operatively attached to an underside of the body 25 of the blender base 24 to protect the components of the blending system 20. The foot member 29 may be selectively attached to the body 25 by any appropriate fastening means 31, including, without limitation, a snap-fit, a threaded engagement, or any other appropriate means. The blender base 24 may also include a front member 33 operatively attached by fastening means 31 to a front of the body 25 of the blender base 24 to protect the components of the blending system 20. These operative components may be of any appropriate configuration—the present teachings are not limited to any specific configuration. The blender base 24 may include a volute system to direct airflow within the blender base 24. The volute system can be a curved pathway provided on an interior portion of the foot member 29. The pathway can be a wall formed materially integrally with the foot member 29 that is operable to direct airflow in a predetermined manner. Accordingly, the wall provides a curved pathway for the air to travel through the blending system 20 during operation thereof. By directing airflow in this manner, the volute system may boost efficiency of the blending system 20 by between 20% to 30% of prior art systems.

The blender base 24 may include vents 36 of any appropriate configuration. The vents 36 may facilitate exhaustion of warm air generated within the blender base 24 during operation of the blending system 20. A fan (not shown), such as a radial fan, may be located within the blender base 24 and used to direct ambient cool air into the blender base 24 to provide cooling air to the motor. The motor may operate the blade base 28 to perform the appropriate blending required of the blending system 20.

The motor (not shown) may be in operative communication with a power cord 44 configured to operatively communicate with a power supply source to provide the appropriate power to operate the blending system 20. A power cord (not shown) may be of any appropriate configuration—the present teachings are not limited to the configurations shown and described herein.

As shown in FIGS. 5-8, the blender base 24 may include a top shell 56 and an inner shell 57. The inner shell 57 provides an enclosed housing for the blender base 24. Accordingly, the inner shell 57 can be configured to generally encase the motor and other electrical components of the blender base 24. The top shell 56 and inner shell 57 may be formed of any appropriate material, including, but not limited to, polymeric materials such as elastomers or rubbers or more specifically thermoplastic or thermoset elastomers, rubber-based materials, and other polymers and co-polymers.

Figure 6:
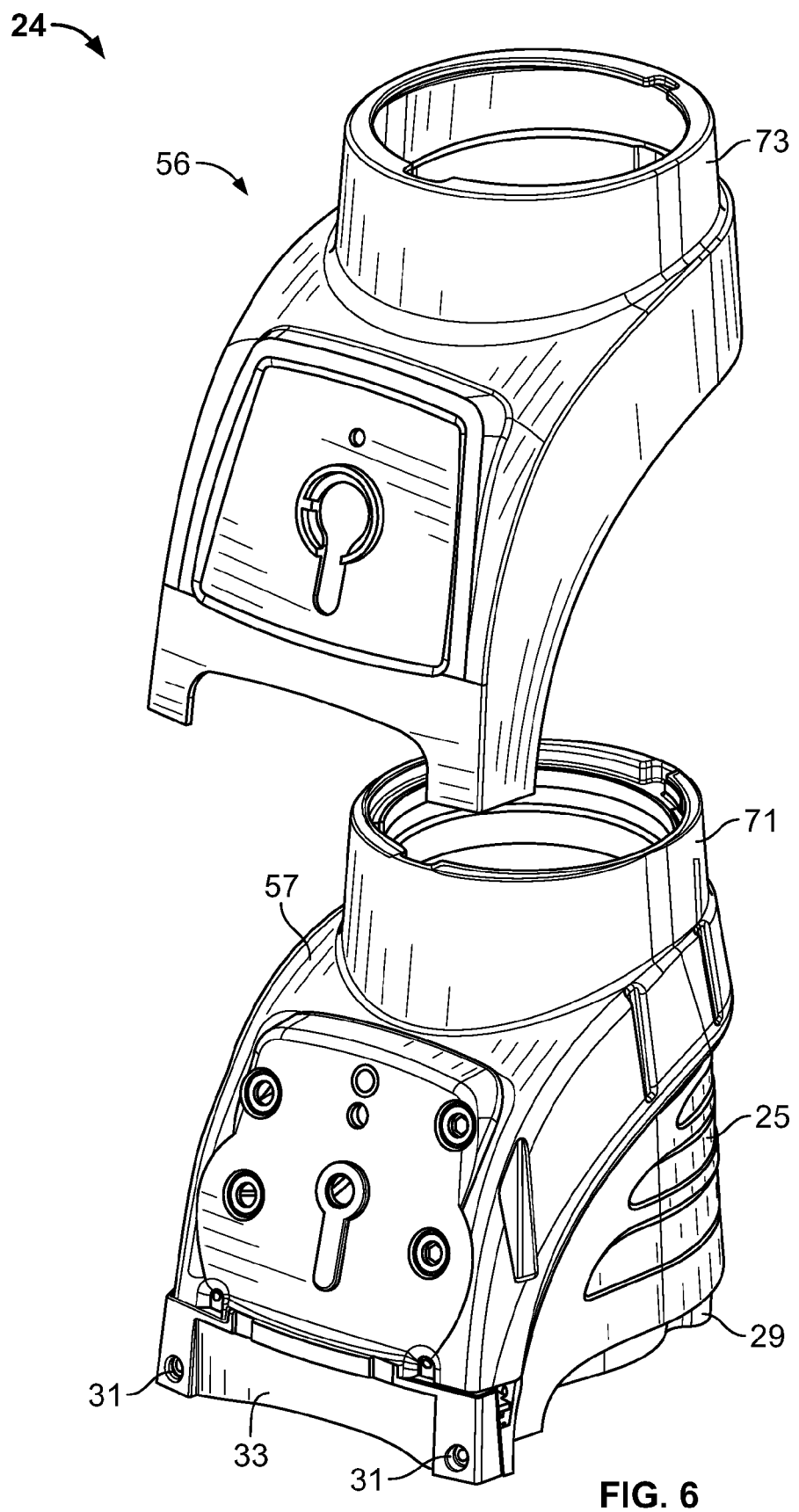
FIG. 6 is an exploded view of a blender base and a corresponding top shell.
Figure 7:
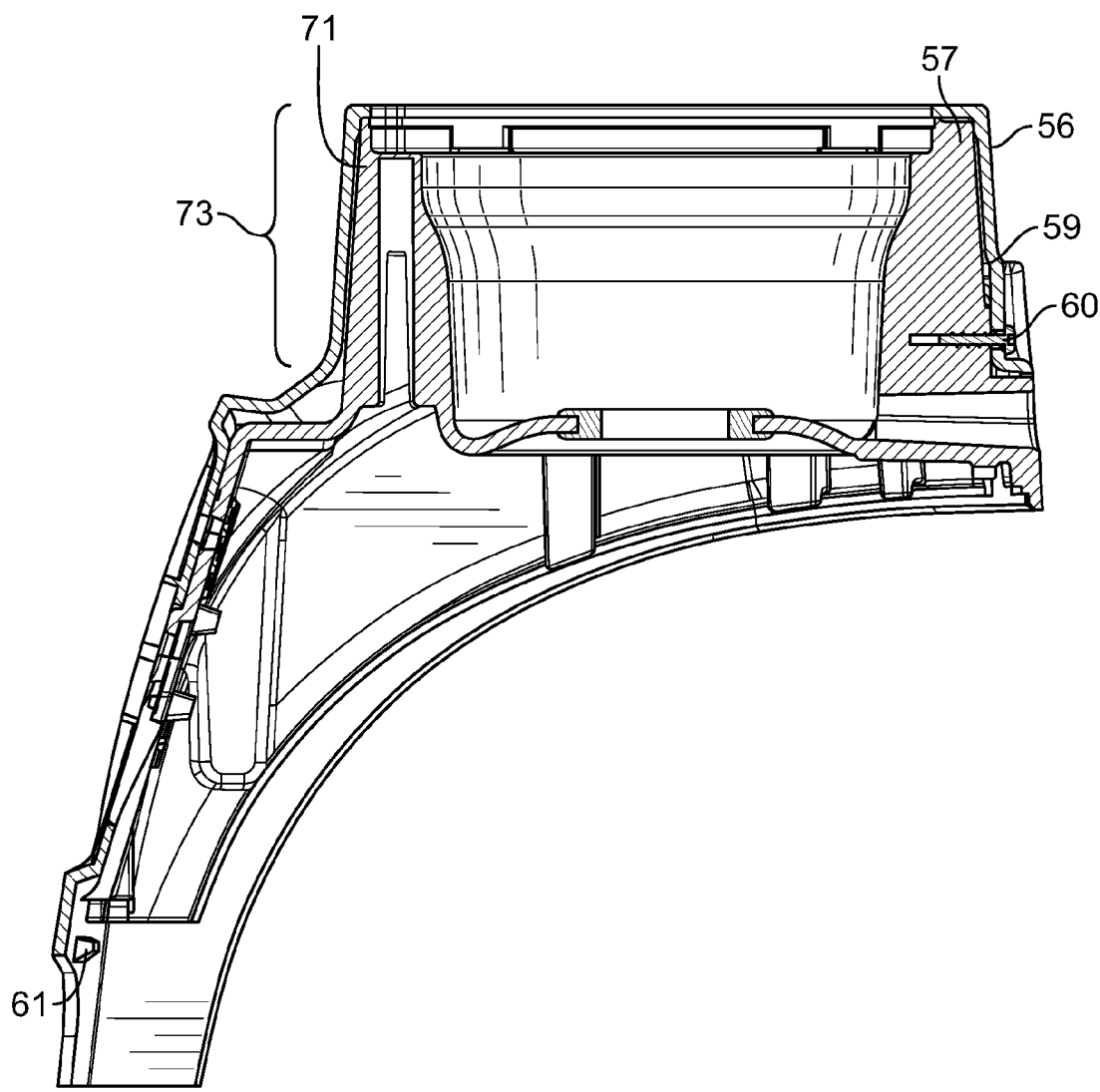
FIG. 7 is a cross-sectional view of the blender base and top shell of the line 7-7 in FIG. 4.
Figure 8:
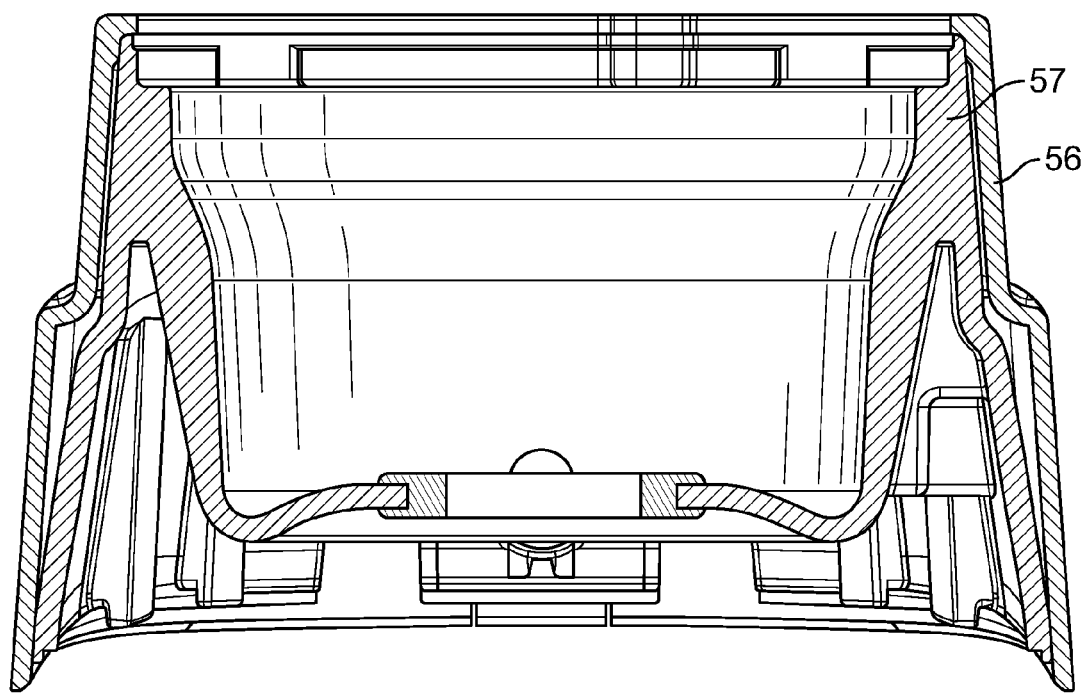
FIG. 8 is a cross-sectional view of the blender base and top shell of the line 8-8 in FIG. 4.
Figure 9:
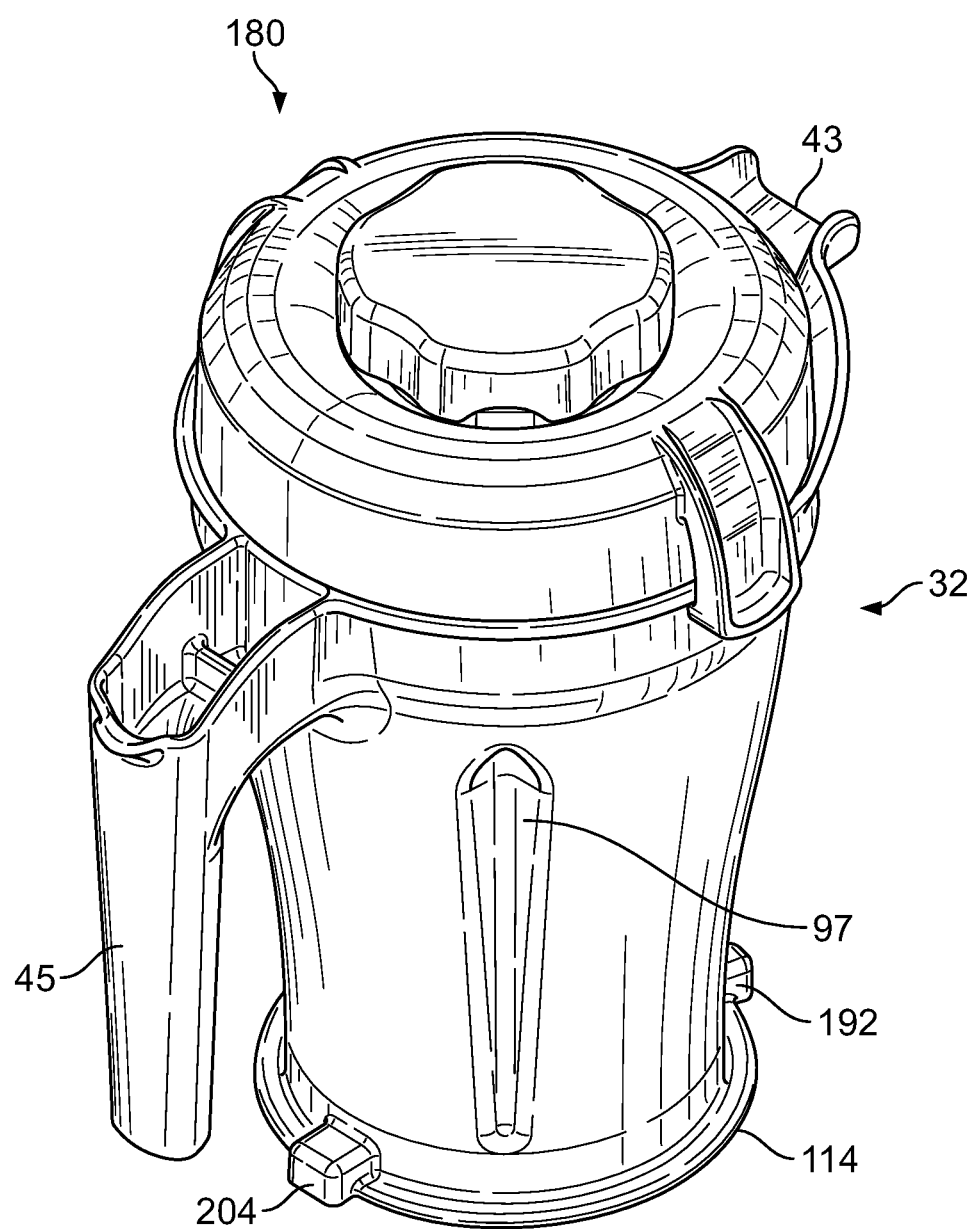
FIG. 9 is a perspective view of an embodiment of a blending container.

The top shell 56 may be provided in a variety of customizable colors, designs, or textures. The top shell 56 may be of any configuration. The top shell 56 may provide a customizable aesthetic finish to the blending system 20. An air gap 59 may be provided between the top shell 56 and the inner shell 57 to reduce vibration that may occur during operation of the blending system 20. This noise insulation may generally reduce the noise of operation of the blending system 20. The top shell 56 may be attached to the inner shell 57 by a fastener 60 of any appropriate type and configuration. By way of a non-limiting example, the fastener 60 may be a threaded fastener that is selectively attachable to the blender base 24 and top shell 56 selectively securing them together. The inner shell 57 may also be independently attached to the blender base 24 as shown in FIG. 6. It is to be appreciated that the top shell 56 may be attached with the inner shell 57 in any appropriate manner, such as by a snap-fit connection 61 as shown.

The top shell 56 does not constitute any portion of the electrical and/or safety enclosure of the blending system 20. Rather, the inner shell 57 sufficiently provides an electrical and safety enclosure that is capable of being approved by a product safety agency, such as UL (Underwriters Laboratories). As a result, the blending system 20 can be shipped internationally and stored at distribution centers without the top shell 56 in place. When orders come in to the distribution center for a particular colored top shell, the distributor can then attach the appropriate top shell 56 to the inner shell 57 of the blending system 20 without requiring any additional product testing or agency approvals. Thus, the top shell 56 can be a purely ornamental component of the blending system 20.

As shown in FIG. 1, the blender base 24 may include a control panel 53 positioned on the front of the blender base 24. The control panel 53 may be of any appropriate configuration and may be utilized to set the operative condition of the blending system 20 by the user. By way of a non-limiting example, the control panel 53 may include at least one knob 72 to selectively adjust settings of the blending system 20, including, without limitation setting rotational speed of the blade base 28 during operation of the blending system 20. The knob 72 can also be used to reset the system, turn the system on/off, select preprogrammed functions, and/or select a pulse function. It will be appreciated that the control panel 53 may further include alternative or additional input devices, such as buttons and switches, and other feedback and readout devices, such as an LCD or LED display.

In those embodiments involving the knob 72, the top shell 56 may include a generally cylindrical wall (not shown) projecting from a face 68 of the top shell 56 and into an interior portion of the knob 72. The wall may be configured to generally prevent ingress of dirt and debris into the base 24. Further, the wall may generally prevent side loads on the knob 72, especially during operation thereof. The wall can be generally cylindrical or of any other suitable shape. The blender base 24 may include a pedestal 76 at a top portion of the blender base 24. The pedestal 76 may be of any appropriate shape and size and can be materially integral with the blender base 24. By way of a non-limiting example, the pedestal 76 may be sized and shaped to cooperate with the blade base 28 as described in more detail below. The pedestal 76 may be of a shape such that an interior of the pedestal 76 corresponds with the external shape of the blade base 28. In the present example, the interior shape of the pedestal 76 and the external shape of the blade base 28 are generally circular. The pedestal 76 may be formed by corresponding portions of both the top shell 56 and inner shell 57. Further, a pedestal portion 73 of the top shell 56 may generally circumscribe at least a portion of the pedestal portion 71 of the inner shell 57 with a lip 216. The pedestal portion 73 of the top shell 56 may provide an aesthetically pleasing finish to the pedestal 76.

The blending system 20 may include a blending container 32 that may be of any appropriate configuration shape and size. The blending container 32 may have a generally pitcher-like configuration including a handle 45 located on an opposite side of the container 32 from a spout 47 to assist in directed pouring, as shown in FIG. 6.

Figure 10:
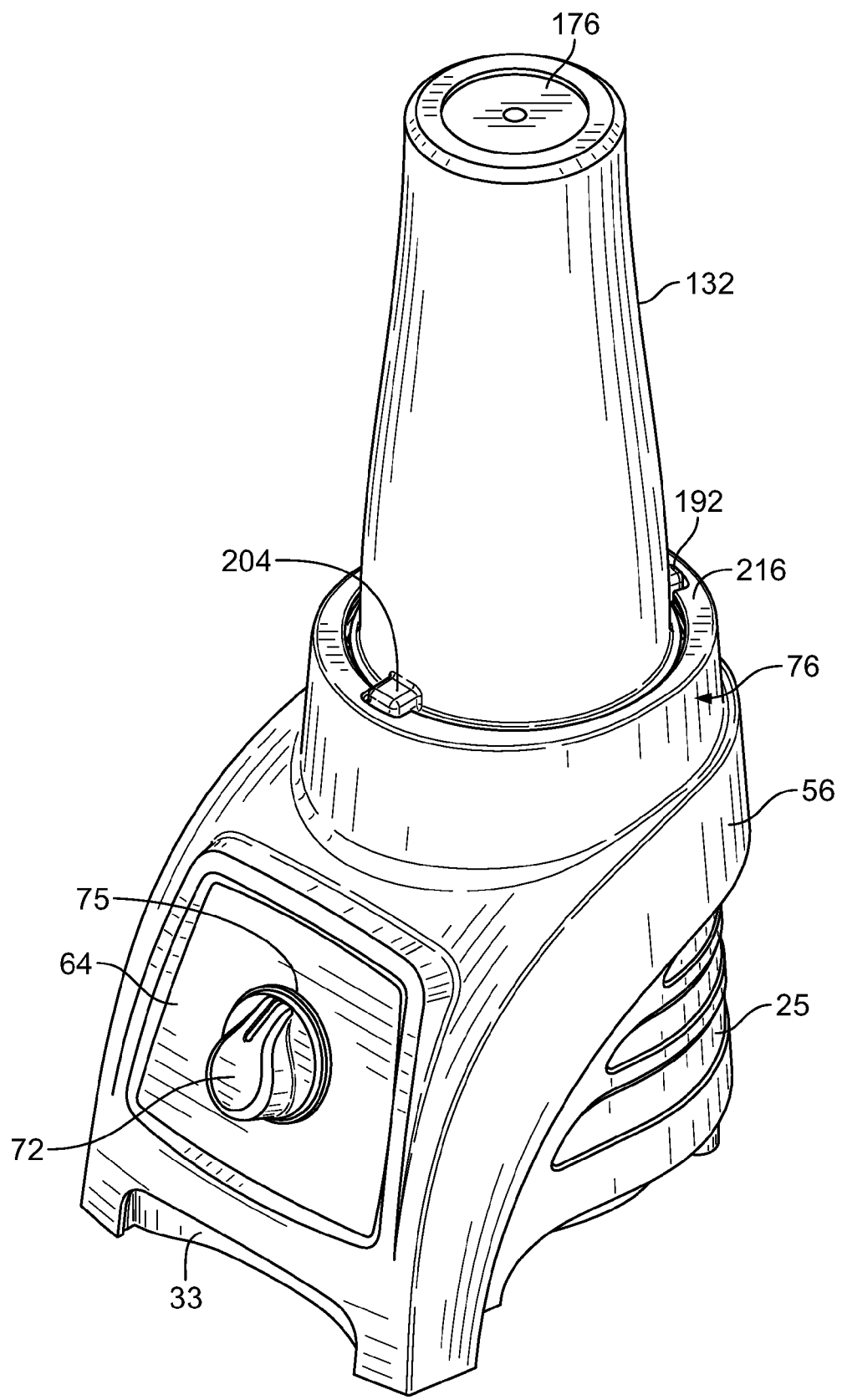
FIG. 10 is a perspective view of a blender system with another embodiment of a blending container.
Figure 11:
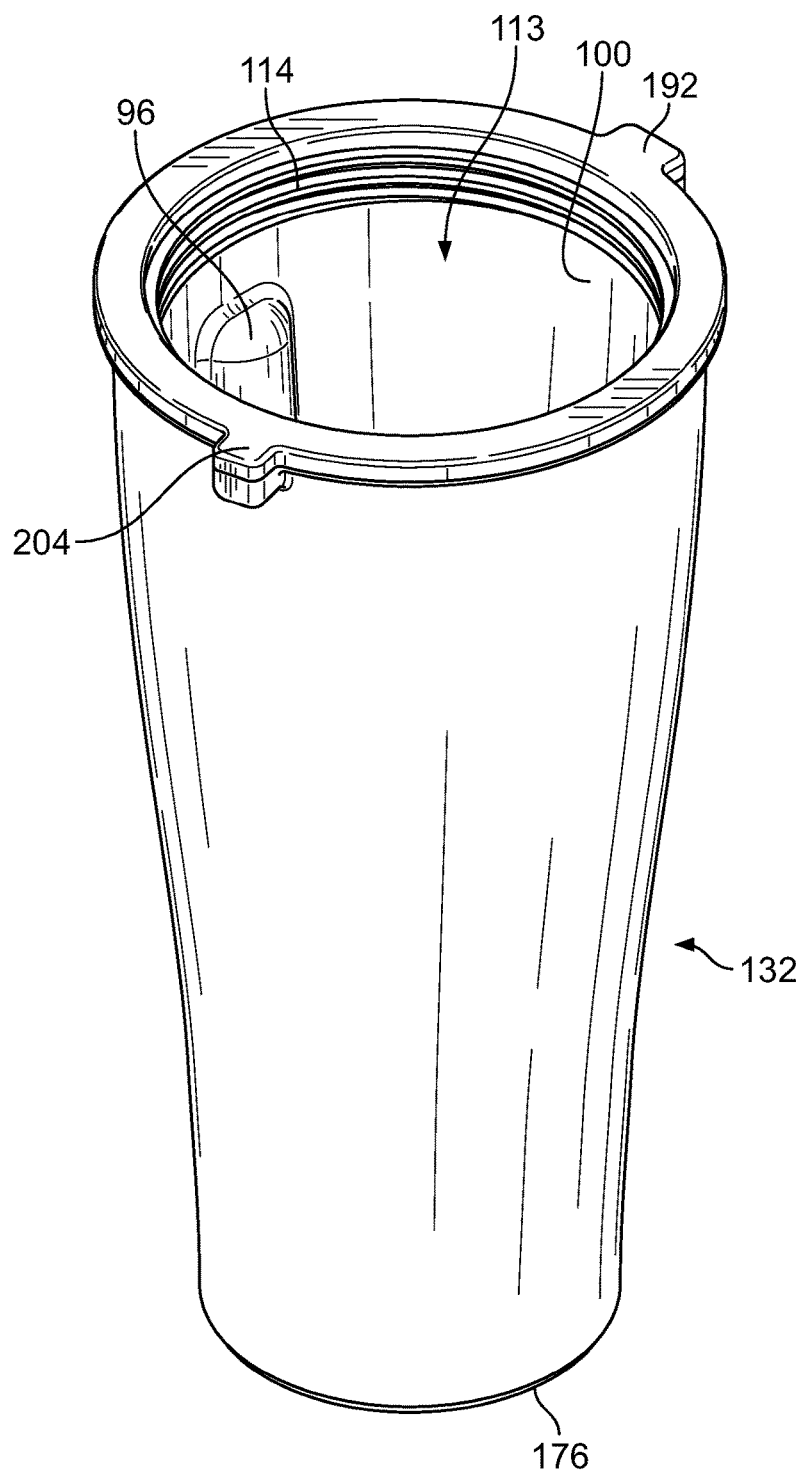
FIG. 11 is a perspective view of a blending container.

In addition or in the alternative, as shown in FIGS. 10 and 11, the blending system 20 may include container 132 to act as a single serve container, i.e., it is a smaller size than a standard blending container. The container 132 may also be of a configuration to act as a drinking vessel. The containers 32, 132 may be a variety of sizes, including, but not limited to, a 20 oz., 24 oz., or a 32 oz. size.

Figure 12B:
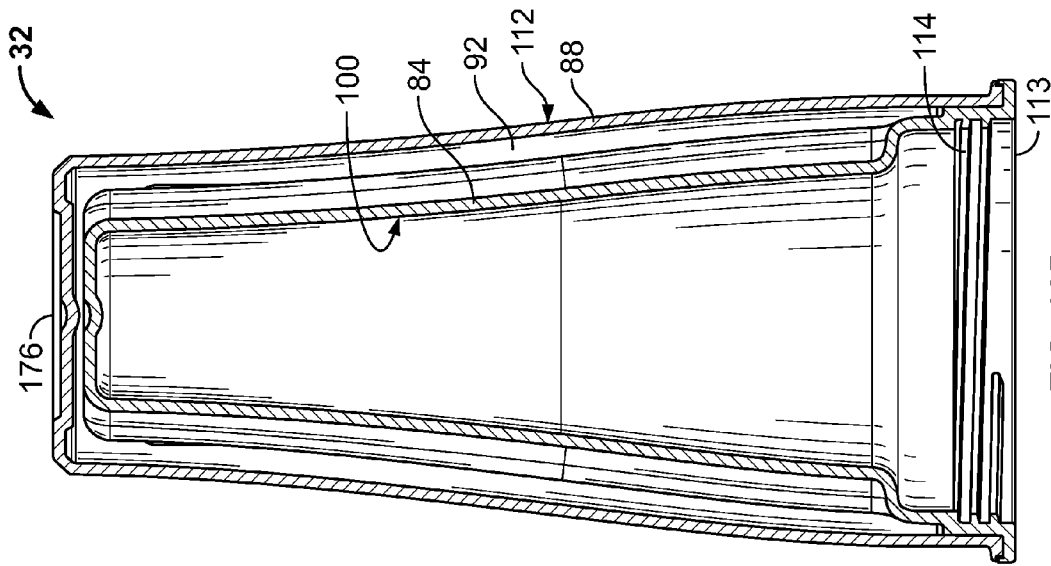
FIG. 12B is a second cross-sectional view of the blending cup.
Figure 12A:
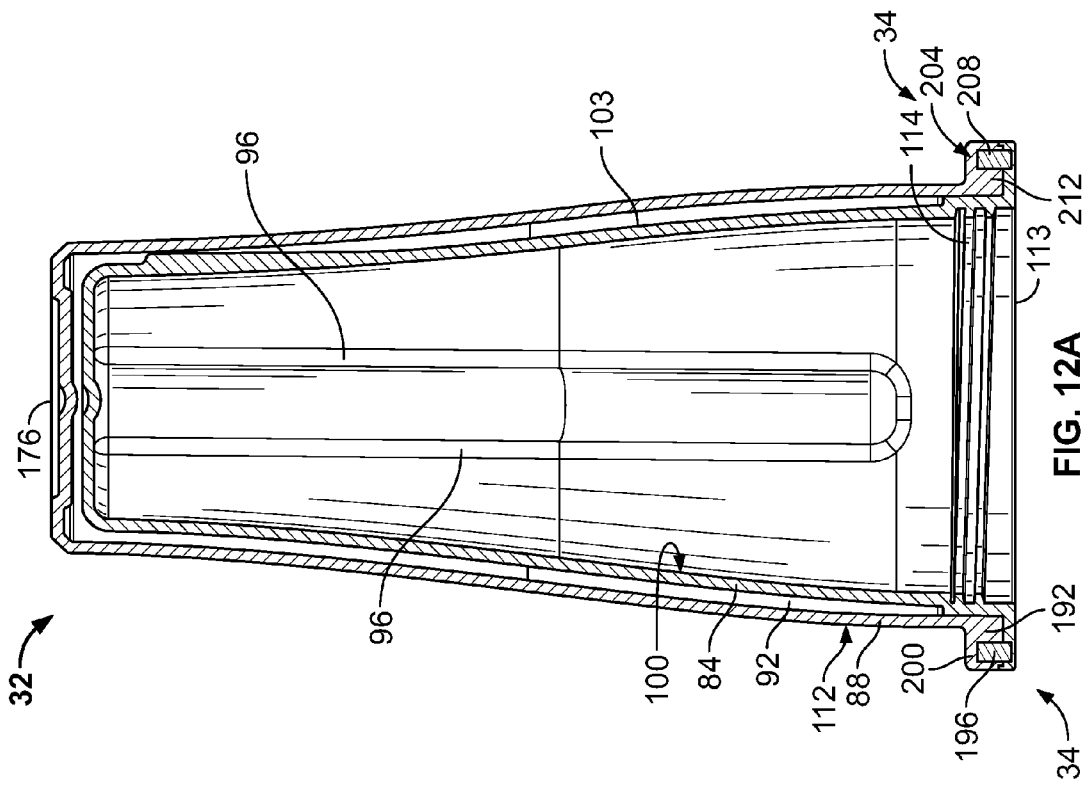
FIG. 12A is a first cross-sectional view of a blending cup.

As shown in FIGS. 12A and 12B, the blending container 132 may be a double-walled container having an inner layer 84 and an outer layer 88 spaced from the inner layer 84. A space 92 may be formed between the inner and outer layers 84, 88. The space 92 may provide an insulative feature to the blending container 132, i.e., it may help the contents thereof remain cool or warm, as applicable. Further, the blending container 132 may include elongated ribs 96 projecting from an interior side 100 of the inner layer 84 into a blending are of the blending container 132. The ribs 96 may comprise one or more protrusions generally spanning a length of the blending container 132. In the present example, there are two ribs 96 spaced at opposing sides of the blending container 132. The ribs 96 may be configured to aid in agitating the contents of the blending container 132 during blending.

Figure 13:
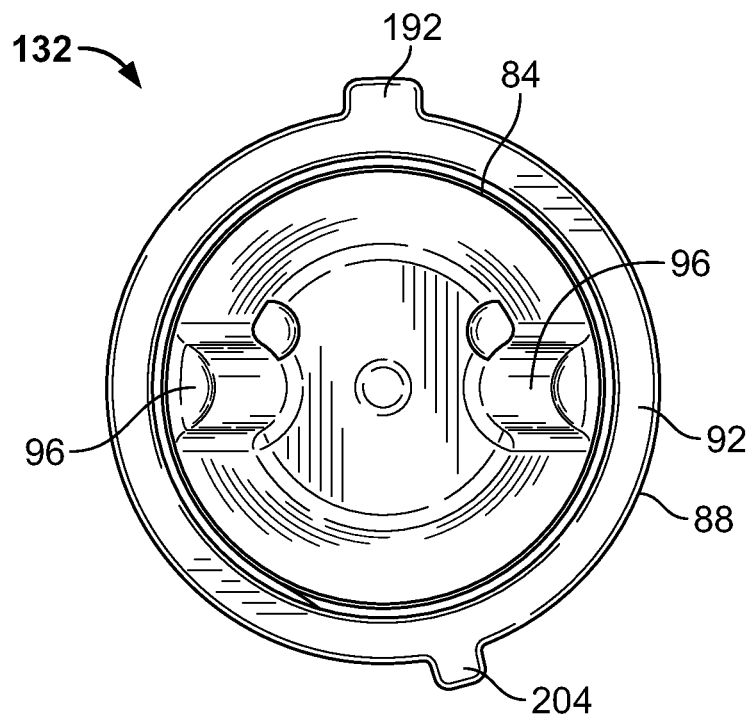
FIG. 13 is a plan view of a blending cup.
Figure 14:
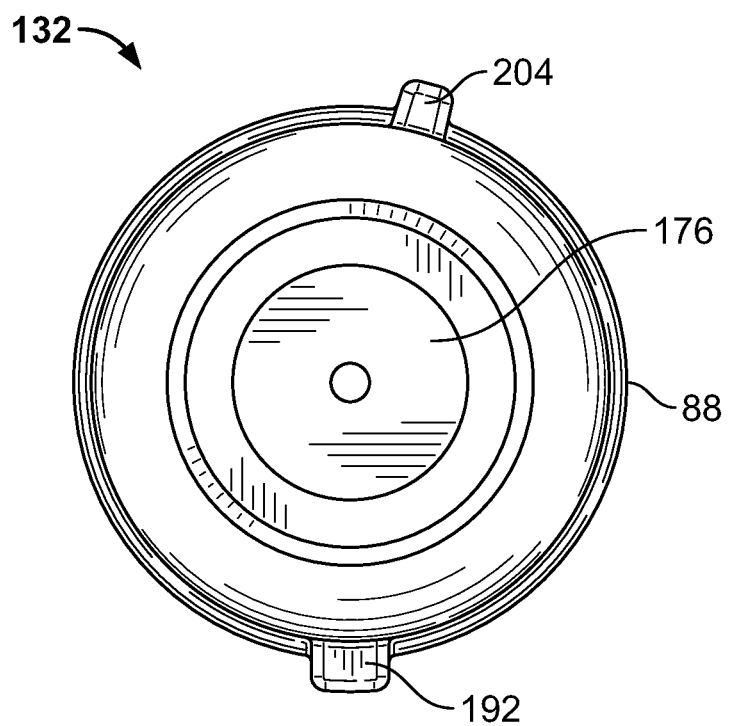
FIG. 14 is an bottom view of a blending cup.

As shown in FIGS. 13 and 14, the blending container 132 also includes a plurality of fins 97 positioned between an outer wall 103 of the inner layer 84 and an inner wall 105 of the outer layer 88. One or more fins 97 may project outwardly from the outer wall of the inner layer 84 or alternatively or additionally, one or more fins 97 can project inwardly from the inner wall of the outer layer 88. The fins 97 facilitate alignment and support of the inner layer 84 within the outer layer 88.

The blending container 32 may include an open end 113 through which material may be inserted in advance of blending or may exit after blending. The open end 113 may be of any appropriate configuration and size. The open end 113 may be of a configuration to permit a user to drink directly therefrom. This may result in the blending container 32 being capable of utilization as a drinking vessel. The blending container 32 may include an engaging portion 114 configured to operatively and selectively engage with the blade base 28. The engaging portion 114 may be of any appropriate configuration and type, including, without limitation being a threaded portion, a bayonet engaging member, or the like. Regardless of the configuration of the engaging portion 114, when secured to an outside portion 112 of the blade base 28, additional blending space is created between an interior portion of the blade base 28 and the open end 113 of the blending container 32, as will be described in greater detail herein.

Figure 15:
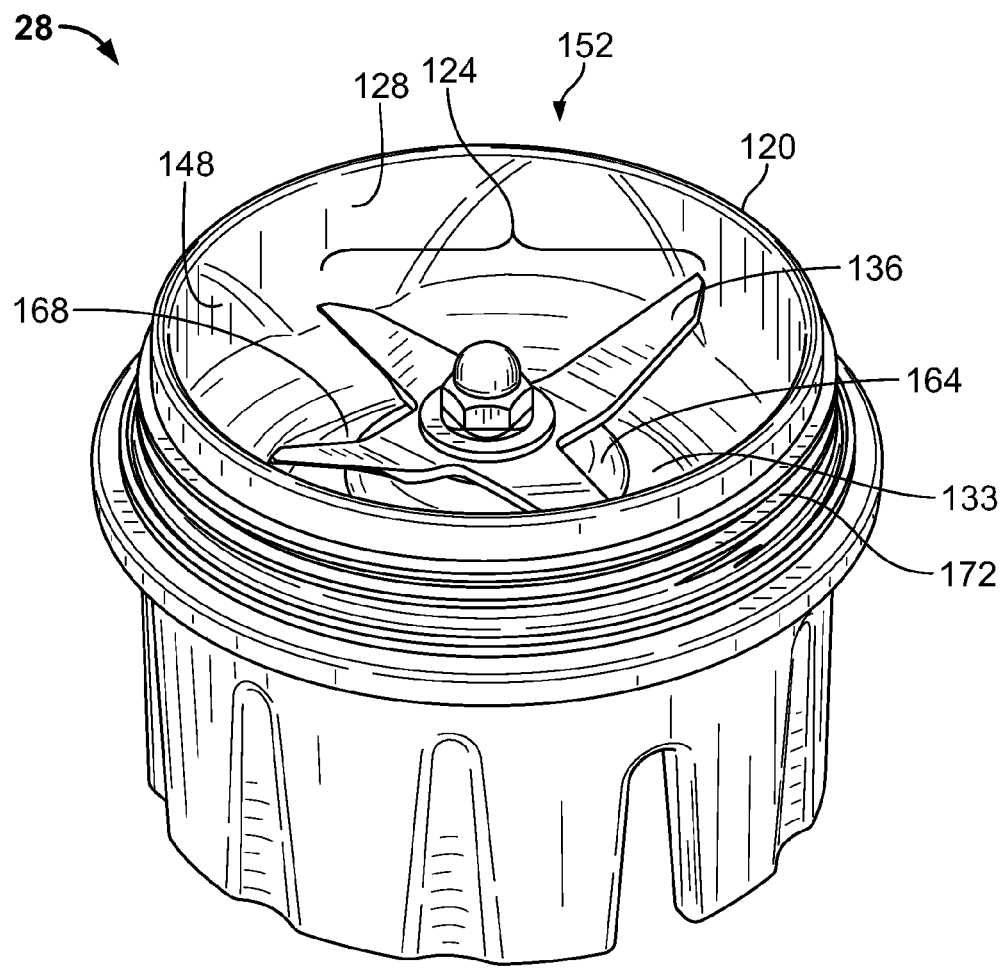
FIG. 15 is a perspective view of an embodiment of a blade assembly.
Figure 16:
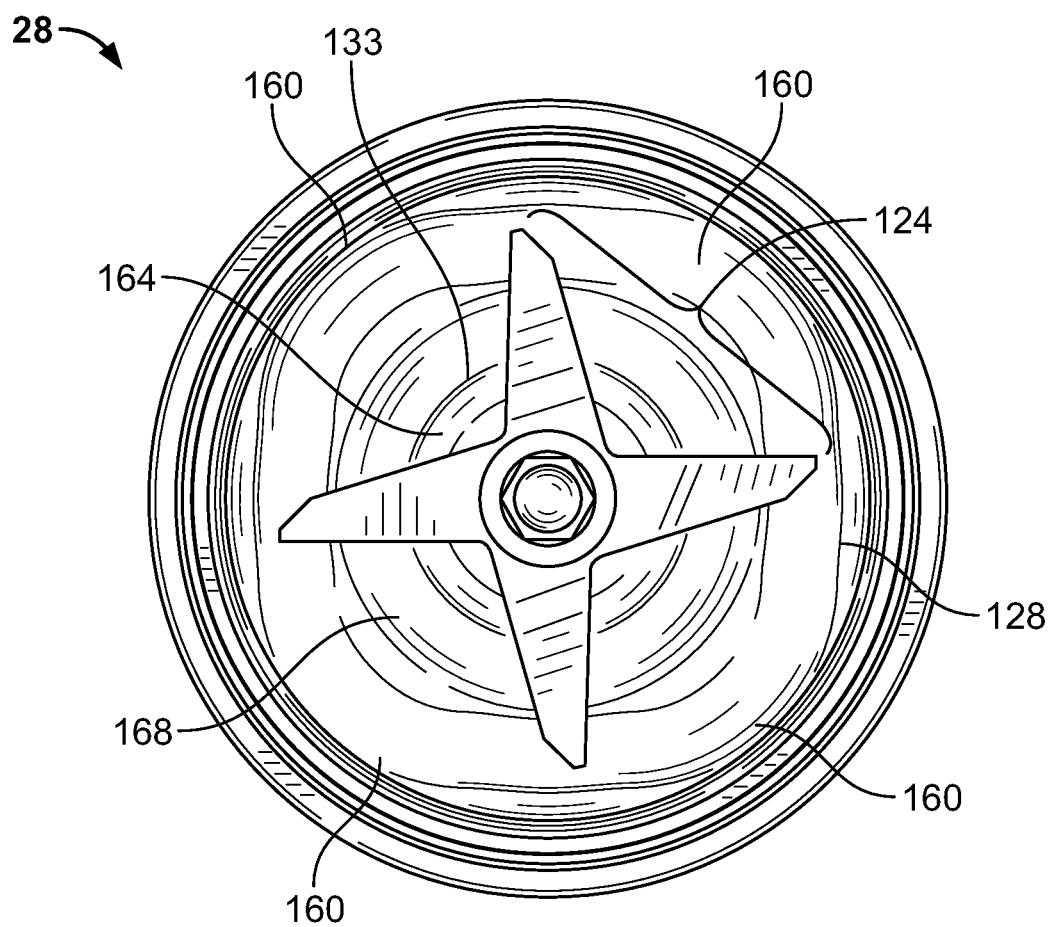
FIG. 16 is a plan view of a blade assembly.

FIGS. 15 and 16 illustrate two different embodiments of the blade base 28. Each embodiment of the blade base 28 may be sized and shaped to operatively fit within an opening 116 in the pedestal 76 in any appropriate manner. The blade base 28 may include a housing 120 having a first side and a second side. A blade 124 is positioned within the first side of the housing 120. The housing 120 may be of any appropriate configuration. As shown in FIG. 13, the housing 120 may include a rectangular inner wall 128 wherein the corners are used for agitating the contents of the attached blending container 32, as will be described herein. Alternatively, as shown in FIG. 12, the housing 120 may include a generally circular inner wall 128 with one or more projections used for agitation. The blade 124 may be connected to the housing 120 in any appropriate manner. The blade 124 may be of any appropriate configuration, type and size. The present teachings are not limited to the configuration shown and described. By way of a non-limiting example, the blade 124 can be of a conventional blender blade configuration and, as such, includes a plurality of radially extending blades 136 that are carried by, and positioned above a bottom surface of the blender base 28 by a vertically oriented blade shaft. The blade shaft extends downwardly through a hub to the second side of the blender base 28. A spline (not shown) is secured to the end of the blade shaft on the second side of the blender base 28. The spline of the blade shaft engages with a splined coupler positioned within the pedestal, the splined coupler being connected to a motor shaft. Accordingly, when the blade base 28 is positioned within the pedestal 76, rotation of the motor shaft caused by actuation of the motor is thereby transferred to the blades, which are rotatably positioned within the blade base.

As mentioned above, the blade base 28 may include features to agitate the flow of material with the blending container 32. For example, the blade base 28 may break up flow of material within the blending container 32 during operation of the blending system 20. In the embodiment shown in FIG. 16, the blade base 28 may include a protrusion 148 on the inner wall 128 of the housing 120. The protrusion 148 may be of any appropriate shape and size. By way of a non-limiting example, the protrusion 148 may be a protrusion 148 extending from the inner wall 128. The protrusion 148 may be any appropriate shape, such as generally rounded. The protrusion 148 may be monolithically formed with the inner wall 128 or may be attached through a subsequent operation. The protrusion 148 may be approximately ½ inch in diameter. The protrusion 148 may extend from a length of the blade base 28 from the bottom wall 133 to an open top end 152. It will be appreciated that the blade base 28 may include more than one protrusion 148. The blade base 28 may also include an agitator 164 positioned on the bottom wall 133. The agitator 164 may be of any appropriate configuration and is not limited to that shown and described. Further, any appropriate number of agitators 164 may be utilized, e.g., one, two, three, etc. In some embodiments, the blade base 28 may not include an agitator 164. The agitator 164 may include a ramped surface formed in the bottom wall 133. The ramped surface may be of any appropriate configuration, including, without limitation being a helical ramp formed with the bottom wall 133. The agitator 164 may be monolithically formed with the bottom wall 133 or may be attached through a subsequent operation. The agitator 164 may form a ledge 168 in the bottom wall 133, which may be utilized to disrupt the flow pattern of the material during use of the blending system 20. The blade base 28 may include one or more agitator 164; the present teachings are not limited to that shown. Further, the bottom wall 133 may not include an agitator 164.

In addition or alternatively, as shown in FIG. 15, the inner wall 128 of the blade base 28 may be of a shape to agitate the flow of material within the blending container 32 during operation thereof. In these embodiments, the base 133 may have a generally rectangular shape such as a generally square shape The engagement between the blade base 28 and the blending container 32 is such that corners 160 of the square-shaped inner wall 128 align with the ribs 96 formed within the inner wall of the container 32. The alignment of the corners 160 and the ribs 96 increases the agitation of the material in the container during the blending operation, thereby improving the blend quality and enhancing the blender performance. Once aligned, the user can also visually confirm that the blade base 28 is operatively secured with the blending container 32.

Figure 17:
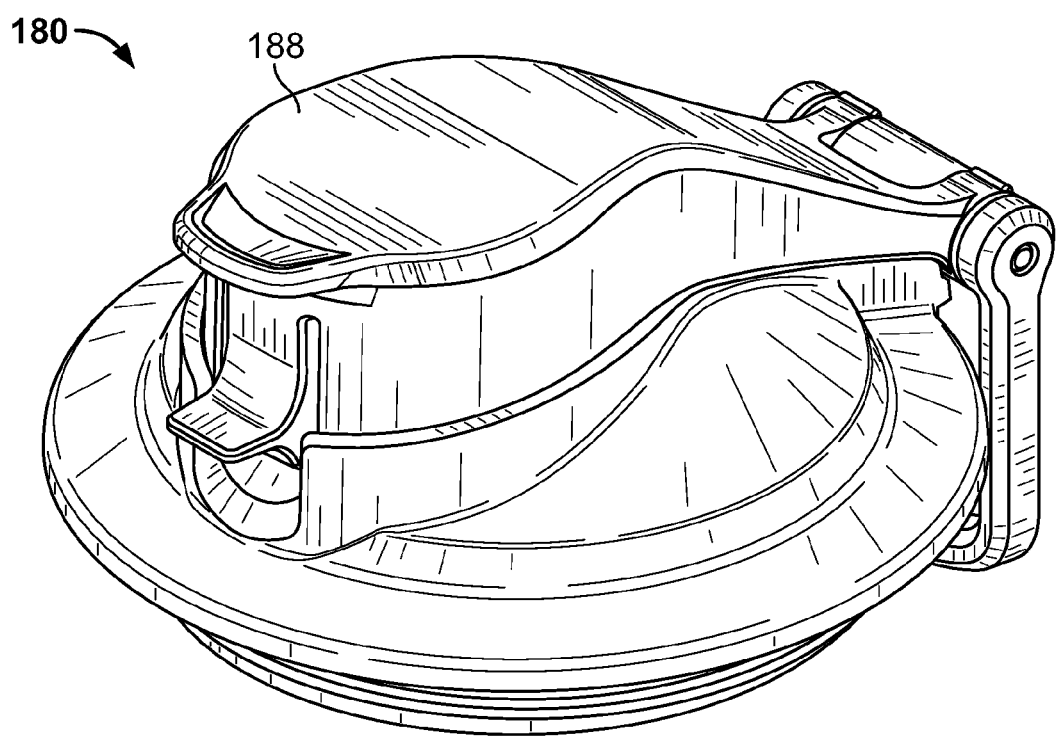
FIG. 17 is a perspective view of a lid.

The blade base 28 may include an engaging portion 172 configured to operatively and selectively secure with the engaging portion 114 of the blending container 32. The engaging portion 172 may be of any appropriate configuration. By way of a non-limiting example, the engaging portion 172 may be a threaded portion 172 configured to mate with the threaded portion 114 of the container portion 32. In these embodiments, the threaded portion 114 of the container portion 32 may be generally circular and the threaded portion 172 of the blade base 28 may correspondingly circular in shape. As described above, the blending container 32 may be configured as a drinking vessel. In these embodiments, the blending container 32 is able to easily convert from a blending container to a drinking vessel. For example, in addition to the open end 113 noted above, the blending container 32 may include a closed end 176 generally opposite the open end 113. When the blending container 32 is operatively secured to the blade base 28, the housing 120 of the blade base 28 is configured such that the housing 120 may create additional blending space for the material to be blended. As an example, the location of the blade 124 within the housing 120 may be generally cup-shaped, which may provide this additional blending space. When removed from the blade base 28, the blending container 32 may function as a drinking vessel. In some embodiments, the blending container 32 may include a lid assembly 180 that is selectively engageable with the open end 113 of the blending container 32. As shown in FIG. 17, the lid assembly 180 may be of any appropriate configuration. For example, the lid assembly 180 may include a base member 184 that may be selectively engageable with the open end 113 in any appropriate manner, including, without limitation via a snap-fit, a threaded engagement, or any appropriate means. The lid assembly 180 may further include a cap 188 that may be selectively positionable relative the base member 184. The cap 188 may be positionable to and from open and closed positions. In the open position, the cap 188 may allow contents within the blending container 32 to be expelled therefrom. In the closed position, the cap 188 may generally prevent contents of the blending container 32 to be expelled. Further, in the closed position, the cap 188 may be engaged with the base member 184 to create a generally liquid tight seal such that regardless of the position of the blending container 32 the contents within the blending container will not be expelled therefrom. In this closed position, the blending container 32 may be utilized during travel or otherwise in storage of the contents therein.

As described above, the blending container 32 and blade base 28 may include the interlock feature 34. The interlock feature 34 may be of any appropriate configuration to generally prevent access to the blade 124 when it is spinning. As shown in FIG. 11, for example, the blending container 32 may include a first tab 192 extending therefrom. As shown in FIGS. 12A and 12B, the first tab 192 may include a magnet 196 embedded therein. The at least one magnet 196 may be secured with the blending container 32 in any appropriate manner. By way of a non-limiting example, the magnet 196 may be welded into a pocket 200 formed in the blending container 32 between the inner layer 84 and the outer layer 88. In a further non-limiting example, the magnet 196 may be adhered, such as through use of an adhesive, between the inner layer 84 and the outer layer 88 of the blending container 32.

Further, as shown, the blending container 32 may include a second tab 204 extending therefrom. The second tab 204 may be of a similar configuration as the first tab 192, but may be of a different size. Further, the second tab 204 may be offset from the first tab 192 along the circumference of the blending container 32 at an angle that is not 180 degrees. In other words, the first tab 192 and the second tab 204 are not aligned with one another, as described in more detail below. The second tab 204 may include a second magnet 208 embedded therein. The second magnet 208 may be welded into a second pocket 212 formed in the blending container 32 between the inner layer 84 and the outer layer 88. In a further non-limiting example, the second magnet 208 may be adhered, such as through use of an adhesive, between the inner layer 84 and the outer layer 88 of the blending container 32. While the first tab 192 with the magnet 196 and the second tab 204 with the second magnet 208 are shown and described, any number of tabs and magnets may be used without departing from the present teachings. Further still, the number of tabs and magnets utilized are not limited to that shown. Any appropriate number of tabs and magnets may be utilized, e.g., two, three, four, etc.

In these embodiments, the first magnet 196 and second magnet 208 may be positioned in the tabs 192 and 204, respectively. Once inserted therein, the inner and outer layers 84, 88 may be sonic welded together. Once sonic welded, the magnets 196 and 208 are melted into the tabs 192 and 204 capturing the magnets 196 and 208 between the inner and outer layers 84, 88.

Figure 19:
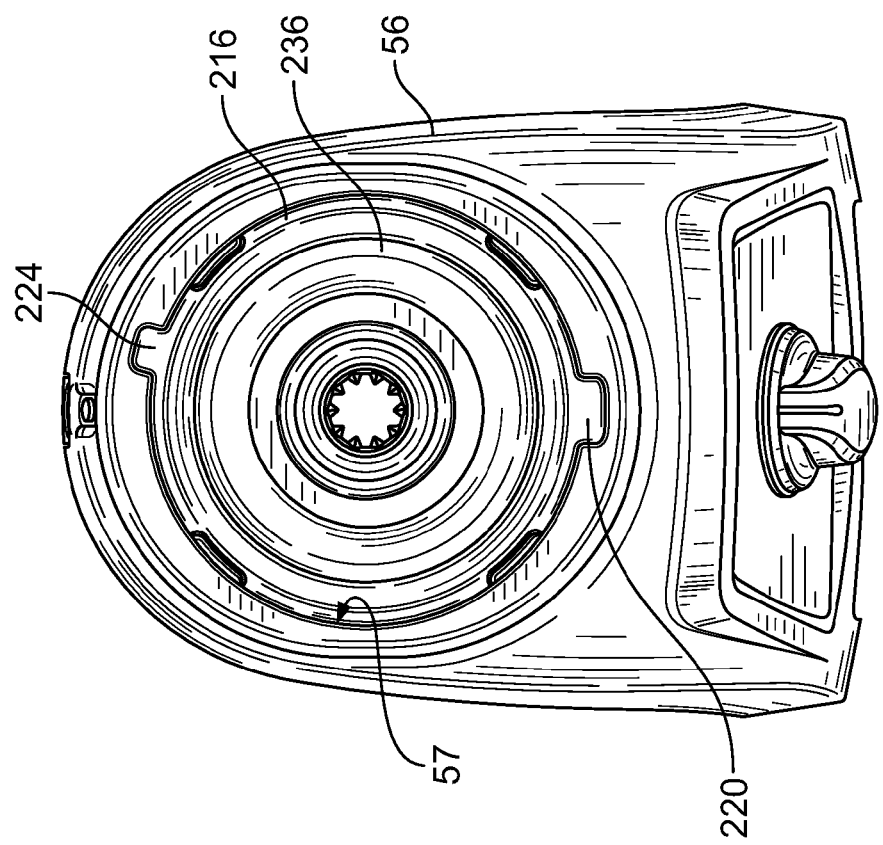
FIG. 19 is a plan view of another embodiment of a blender base.
Figure 18:
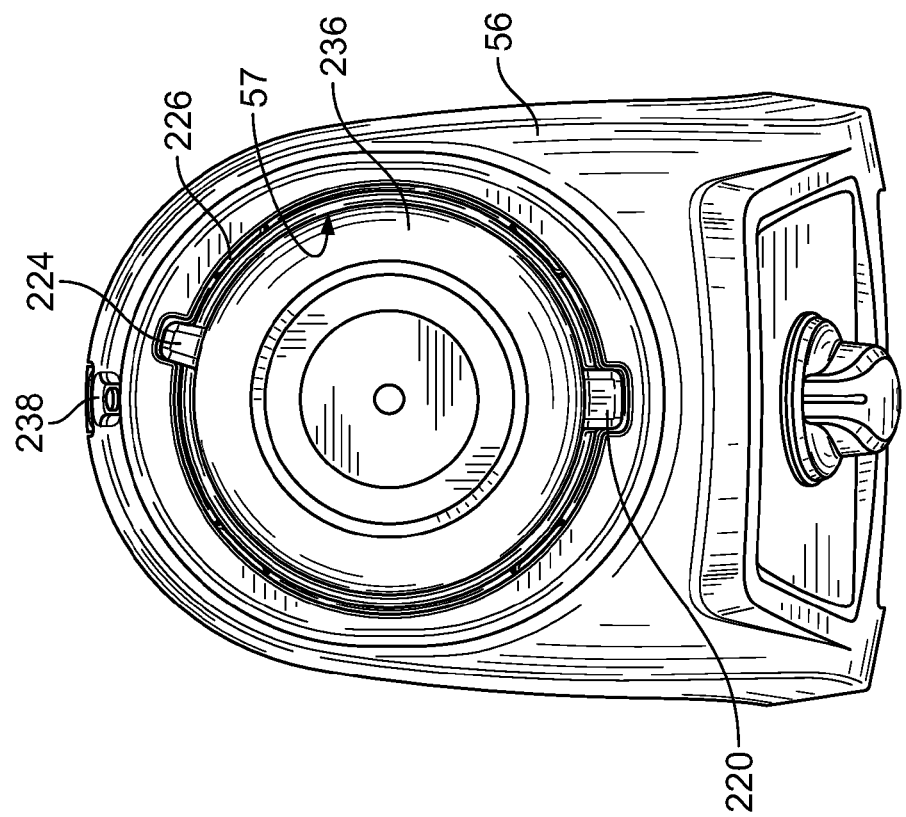
FIG. 18 is a plan view of a blender base.
Figure 20:
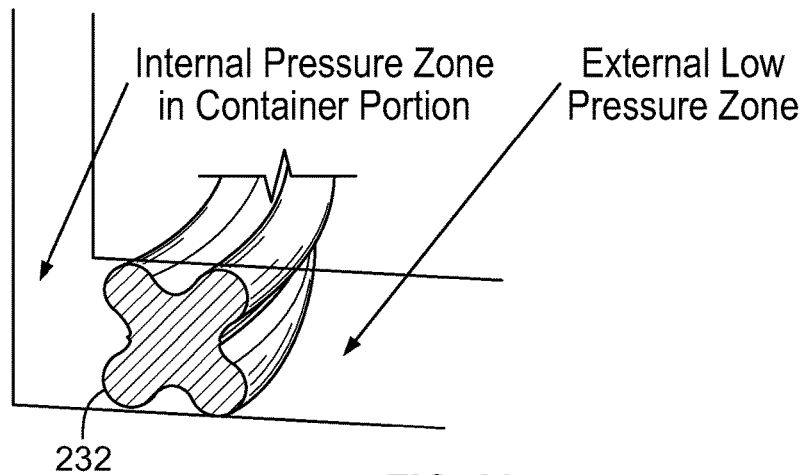
FIG. 20 is a cross-sectional view of a gasket of a blender system.
Figure 21:
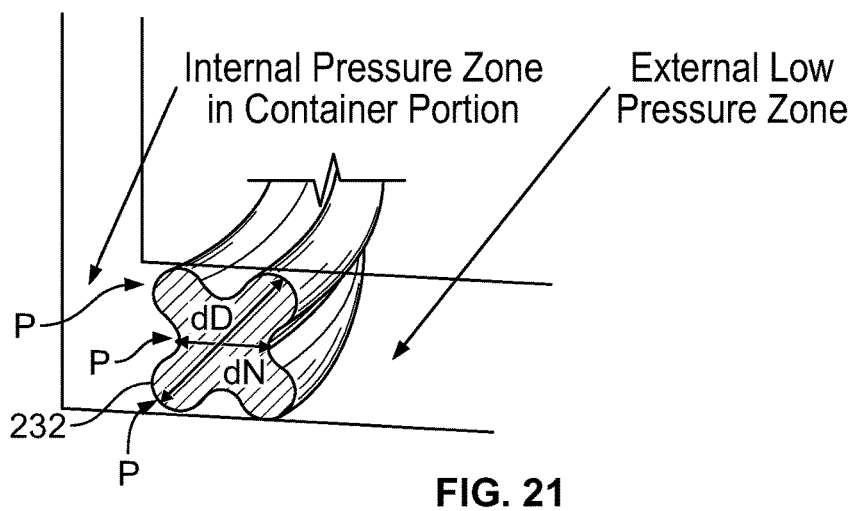
FIG. 21 is a cross-sectional view of a gasket of a blender system.
Figure 22:
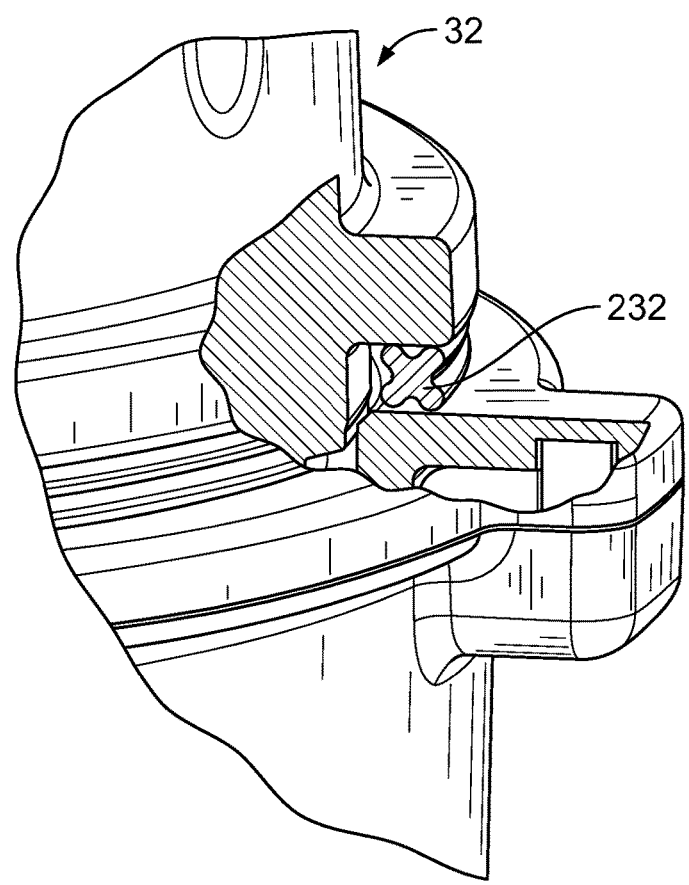
FIG. 22 is a cross-sectional view of a gasket on a blending system.

As shown in FIGS. 4, 18, and 19, the blender base 24 may includes the lip 216 in the opening 116 in the pedestal 76; the lip 216 may generally encompass a majority portion or all of the opening 116. The lip 216 may include first and second recessed portions 220, 224. The first and second recessed portions 220, 224 may be configured such that the tab 192 and second tab 204 are selectively and operatively engageable with such first and second recessed portions 220, 224. The first recessed portion 220 may be shaped and sized such that only the first tab 192 may be capable of operatively engaging it. Similarly, the second recessed portion 224 may be shaped and sized such that only the second tab 204 is operatively engageable therewith. This configuration may help align the blending container 32 and blade base 28 with the blender base 24. As noted above regarding the relative positions of the tab 192 and second tab 204, the first and second recessed portions 220, 224 may be offset from one another such that they are not aligned at 180 degrees with respect to one another.

Further each of the first and second recessed portions 220, 224 may include a sensor, such as a reed switch (not shown) in its proximity. The reed switch may be utilized to indicate when both of the tab 192 and second tab 204 are operatively positioned within the first and second recesses 220, 224. Contacts of the reed switch may be in normally open position when the magnets 196 and 208 are not in proximity thereto, i.e., when the tabs 192 and 204 are not positioned in the first and second recessed portions 220, 224. When the magnets 196 and 208 within the tabs 192, 204, respectively, are moved in operative proximity to the reed switch, the reed switch will close, i.e., the reed switch will close when a magnetic field is present. Once the magnets 196 and 208 are moved away from the switch, the reed switch will go back to its original open position.

When the reed switch is in the open position, the motor is configured to be disabled, i.e., not operate. When the motor is disabled, the blade base 28 and more particularly, the blade 124 is not capable of operation. Therefore, in order to operate the blending system 20, the blending container 32 and blade base 28 must be operatively coupled with the blender base 24. Specifically, the tabs 192 and 204 must be operatively positioned within the first and second recessed portions 220, 224, respectively in order for the blending system 20 to operate. This generally prevents the user from being able to access or otherwise contact the blade 124.

The aforementioned interlock feature 34 is further configured to generally prevent circumvention by a user. For example, the reed switch may be calibrated to disengage or disable the motor anytime the magnet 196 or second magnet 208 or both are a predetermined distance away from the reed switch. The predetermined distance may be calibrated so that the user may not create enough space between the blending container 32, blade base 28, or blender base 24 to access the blade 124.

While the blending system 20 is operating, i.e., the motor is operating, the blending system 20 tends to attempt to rotate the blending container 32 relative to the blender base 24. The tabs 192 and 204 being engaged with the first and second recessed portions 220, 224, respectively may prevent the blending container 32 from rotating—it may maintain the blending container 32 in its operative position with respect to the blender base 24. The tabs 192 and 204 may be generally rectangular in shape. Further, the corresponding first and second recessed portions 220, 224 may be of a corresponding rectangular shape. The rectangular shape may provide the anti-rotation feature generally keeping the interlock feature 34 operatively aligned.

The blender base 24 may include a visual indicator, such as an LED or the like, to provide feedback to a user on the status of the interlock feature 34. For example, the visual indicator may provide a slow flash if the machine is plugged in but the container is not properly in place on the blender base 24. The visual indicator may provide a solid (no flash) light if the machine is plugged in, the container is in place, and the machine is ready to blend. A fast flash may be provided by the visual indicator if an error occurred, such as: the blender base 24 is plugged in while a variable speed control is not in the stop position; a container was placed on the machine while the variable speed control is not in the stop position; and/or a container was removed from the machine while operating.

The blade base 28 may further include a gasket 232 configured to provide a seal between the blade base 28 and blending container 32 when coupled together. The gasket 232 may have a generally X-shaped cross section, such as shown in FIG. 11. The gasket 232 may generally span the periphery of the blade base 28 such that when the blade base 28 and blending container 32 are coupled—such as being threaded together—the gasket 232 is positioned along the entirety of a location of engagement between the blade base 28 and blending container. While the gasket 232 is shown as having a generally X-shaped cross-section, it will be appreciated that the gasket 232 may have any appropriate cross-sectional shape that performs the same function described below. By way of a non-limiting example, the gasket 232 may have a diameter of a narrow portion $d_N$ that is shorter than a diameter of a distended portion $d_D$, such as shown in FIG. 12. The gasket 232 may be formed of any appropriate material, including, but not limited to, polymeric materials such as elastomers or rubbers including thermoplastic or thermoset elastomers, rubber-based materials, and other polymers and co-polymers having properties consistent with the features described above.

The gasket 232 may be configured to seal at low pressures and allow gas to exit at pressures that exceed a predetermined pressure within the blending container 32 during operation of the blending system 20. For example, the gasket 232 may function as a seal when the internal pressure zone within the blending container 32 exists from zero pressure to the predetermined level of pressure. After the internal pressure zone within the blending container 32 exceeds the predetermined level pressure—this may be considered a high pressure condition—the configuration of the gasket 232 may displace the gas within the blending container 32 to safely relieve pressure from the internal pressure zone, as shown in FIG. 12. The gasket 232, however, also maintains its operative position between the blending container 32 and the blade base 28 so that material within the blending container 32 does not leak as shown in FIG. 19.

In operation, if the user requires the blending system 20 to perform a recipe requiring a longer operation time, the friction of the spinning blade 124 may generate heat within the blending container 32. As the heat in the blending container 32 increases, so does the pressure. As the operation continues, the pressure may continue to build up to a predetermined level. If the force of the internal pressure zone increases above that predetermined level, the gasket 232 is configured to displace that internal pressure to allow interior pressure to escape into the atmosphere. The shape of the gasket 232 allows the internal gas of the blending container 32 to escape while the solids and liquids remain within the blending container 32. Thus, the pressure within the blending container 32 is generally prevented from exceeding a predetermined level.

The blending system 20 may, however, include a spill moat 236 if any liquid escapes from the blending container 32 either during operation, during insertion of the material to be blending or while expelling the material from the blending container 32. The spill moat 236 may be of any appropriate configuration and may be positioned in the pedestal 76. By way of a non-limiting example, the spill moat 236 may be positioned on the periphery of the pedestal 76. The spill moat 236 may be configured to capture any escaping liquid and allow it to flow along a predetermined path. At a conclusion of the predetermined path of the spill moat 236, the blender base 24 may include at least one aperture 238. The aperture 238 may be configured to allow the liquid to exit from the blending system 20. The combination of the spill moat 236 and aperture 238 may generally prevent liquid from inadvertently entering the blender base 24 and more specifically from entering the working components of the blending system 20, such as the motor.

Although the embodiments of the present teachings have been illustrated in the accompanying drawings and described in the foregoing detailed description, it is to be understood that the present teachings are not to be limited to just the embodiments disclosed, but that the teachings described herein are capable of numerous rearrangements, modifications and substitutions.

What is claimed is:

1. A blending system comprising:
a base including a motor;
a blade assembly selectively and operably engaged with the base, wherein the motor drives the blade assembly;
a container comprising at least two magnets, a tab extending from a periphery of the container, and a second tab extending from the periphery of the container, wherein the tab is a different shape or size than said second tab; and
at least two sensors positioned in the base, wherein the at least two magnets in operative proximity to the at least two sensors permits operation of the motor.

2. The blending system of claim 1, wherein the base includes a recessed portion adapted to receive the tab of the container.

3. The blending system of claim 2, wherein the recessed portion includes a first sensor of the at least two sensors.

4. The blending system of claim 3, wherein the first sensor includes a switch.

5. The blending system of claim 4, wherein the switch includes a Reed Switch.

6. The blending system of claim 1, wherein the second tab is at an angle from the tab along the periphery.

7. The blending system of claim 6, wherein the angle is approximately 165 degrees.

8. The blending system of claim 1, wherein the first tab includes a first magnet of the at least two magnets and the second tab includes a second magnet of the at least two magnets.

9. The blending system of claim 8, wherein the base includes a second recessed portion adapted to receive the second tab of the container.

10. The blending system of claim 1, wherein the second recessed portion includes a second sensor of the at least two sensors, whereby the second magnet in operative proximity to the second sensor permits operation of the motor.

11. The blending system of claim 10, wherein the second sensor is a Reed Switch.

12. The blending system of claim 11, wherein either of the first magnet and second magnet being a distance from the first sensor and second sensor, respectively prevents operation of the motor.

13. A blending system comprising:
a base encasing a motor and comprising at least one sensor;
a blade base in operative communication with the motor and selectively engaged with the base, the blade base comprising
a blade operatively engaged with the motor; and
an engagement member;
a container comprising a first tab extending from a periphery of the container and a second tab extending from the periphery of the container wherein the second tab are offset from each other along the periphery of the blending container at an angle that is not 180 degrees, and wherein the first tab and the second tab selectively attach with the engagement member of the blade base, and comprising at least two magnets that operatively interact with the at least one sensor.

14. The blending system of claim 13, wherein a first magnet and second magnet of the at least two magnets are offset around a periphery of the container.

15. The blending system of claim 14, wherein the first magnet and the second magnet of the at least two magnets are less than 180 degrees from each other about the periphery of the container.

16. The blending system of claim 13, wherein the container comprises an inner layer and an outer layer.

17. The blending system of claim 13, wherein the angle is approximately 165 degrees.

18. A method for a blending system comprising:
providing a blender base encasing a motor;
providing a container that operatively attaches to the blender base, and comprising a tab extending from a periphery of the container, and a second tab extending from the periphery of the container, wherein the tab is a different shape or size than said second tab;
sensing alignment of at least two sensors and at least two magnets between the blender base and the container, wherein the at least two sensors are offset from each other.

* * * * *